Jan. 17, 1956   J. MEKALAINAS   2,730,856
AERATOR ATTACHMET FOR LAWN MOWERS
Filed Aug. 10, 1954

*INVENTOR.*
JOHN MEKALAINAS
BY
Michael J. Forsella ated Jan. 17, 1956

2,730,856

AERATOR ATTACHMENT FOR LAWN MOWERS

John Mekalainas, Westbury, N. Y.

Application August 10, 1954, Serial No. 448,886

1 Claim. (Cl. 56—249)

The present invention relates to a device for aerating a lawn, and more particularly to an aerator suitable for attachment to lawn mowers as they are presently constructed.

It is well known in the art, that at various times of the year the soil tends to pack and harden due to the baking action of the sun thereon. Natural rainfall, or water otherwise applied, will not readily penetrate the soil in it's then condition, but will tend to run off in the form of surface drainage. Nor can air readily get into the soil, nor fertilizer be advantageously applied, to improve it's capacity for cultivation. A healthy and attractive lawn cannot be cultivated under these conditions. It becomes necessary to break and loosen the soil by making a multitude of holes therein. This process is known as "aeration," and is sometimes referred to as "spiking the lawn."

Similar devices of the prior art have been employed to spike a lawn, but heretofore these have been either large and cumbersome powered units, expensive to purchase or rent, or they have been in the form of rudimentary prong-line devices, manually operable, and requiring considerable muscular effort to effectively employ.

The present invention contemplates a simple and economical rotary device, easily attachable to lawn mowers as they are presently constructed, and detachable with equal ease, which will perform the spiking operation rapidly, efficiently, and with relatively little personal effort, while at the same time the mower is performing it's usual operation of cutting the grass.

It is therefore one of the objects of the present invention to provide a device for spiking a lawn which can be quickly and conveniently attached to, and detached from, a lawn mower, and more particularly attached to and detached from, the wheels of a lawn mower.

Another object of the invention is to provide a device of the above indicated nature which will spike a lawn simultaneously with the usual cutting operation of the lawn mower.

Still another object of the invention is to provide a device of the above indicated nature which can be attached to a lawn mower, without any change in the structure of the lawn mower.

Still another object of the invention is to provide positive and effective means for aerating a lawn which will require relatively little physical effort to employ.

Another object of the invention is to provide means for spiking a lawn which will be simple and cheap in construction, yet effective and reliable to a high degree in use.

Still another object of the invention is to provide novel and effective means for aerating a lawn rapidly and with relatively little effort, while simultaneously mowing the lawn.

The foregoing and other objects and advantages will appear more fully hereinafter from a consideration of the detailed description which follows, taken together with the accompanying drawing, wherein one embodiment of the invention is illustrated by way of example. It is to be understood however, that the drawing is for the purposes of illustration only, and is not to be construed as defining the limits of the invention.

Referring to the drawing, wherein like characters designate like parts throughout the several views, Figure 1 is an elevation view of the device.

Figure 1:
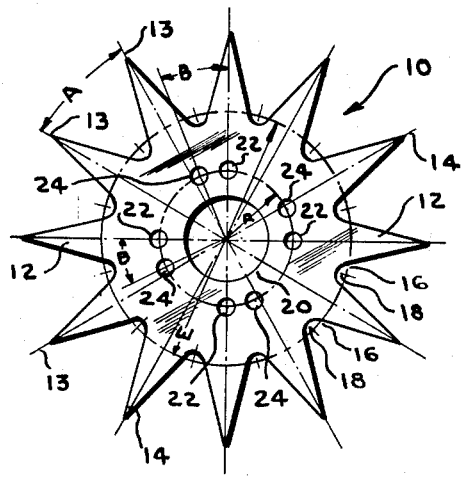

Referring now to the drawing for a more detailed description of the invention, and more particularly to Figure 1, the numeral 10, generally indicates a flat metal disc having a plurality of teeth 12, about its periphery, and emanating therefrom.

The teeth 12, are preferably disposed at approximately thirty degree intervals about the periphery of the disc 10, as shown by the reference angle A, between the center lines 13, of each tooth 12. The teeth 12, are relatively acute, and terminate in a point 14. For purposes of facilitating manufacture of the disc 10, the bases 16 of the teeth 12, blend into the periphery of the disc 10, by means of a gentle radius 18.

For reasons hereinafter explained, a concentric hole 20, is located in the center of the disc 10. A plurality of holes 22, are located about the center hole 20, on a constant radius R as shown in Figure 1. A hole 24, is located approximately fifteen degrees in a counter-clockwise direction from each hole 22, along the same radius R as shown by the reference angle B, and the holes 24, are of the same diameter as the holes 22.

Figure 2:
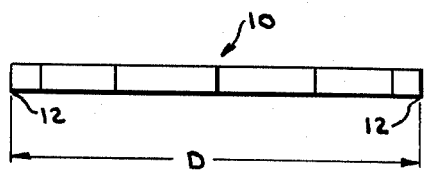
Figure 2 is a plan view of Figure 1.

The disc 10, is so constructed in size, that the outer diameter D of the disc (Fig. 2) is larger than the diameter of the wheels of a usual lawn mower, as lawn mowers are presently constructed, and the smaller diameter E (Fig. 1) of the disc 10, is not greater than the diameter of the wheels of a usual lawn mower. The reason for this will be hereinafter explained.

Figure 3:
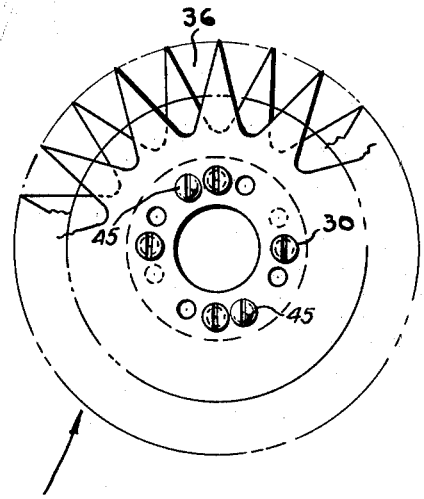
Figure 3 is an elevation view of an assembly of two of the components shown in Figures 1 and 2.
Figure 4:
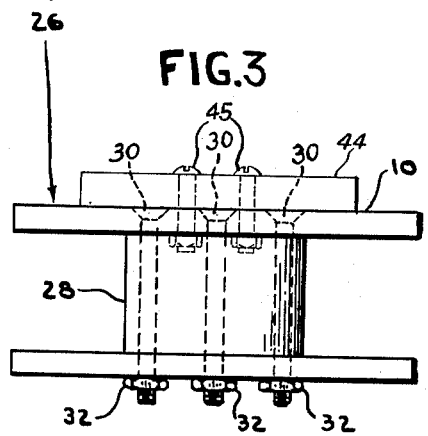
Figure 4 is a plan view of Figure 3.

Referring now to Figures 3 and 4, an assembly generally designated by the numeral 26 comprises a pair of discs 10, separated by a single hollow spacer 28, and secured in the usual manner by through bolts 30, and nuts 32. The spacer 28, is perfectly cylindrical and is installed at right angle to the discs 10, so that the discs 10 are parallel to each other. It will be noted however, as shown by the cutaway portion of Figure 3, designated by the numeral 36, that the discs 10, are installed in the assembly 26, in such a manner that each bolt 30, is passed through one hole 22, on one of the discs 10, and through one hole 24, on the companion parallel disc 10, so that in effect the teeth on one disc are necessarily staggered by approximately fifteen degrees (Angle "B"), from the teeth on the opposite parallel disc. The reason for this arrangement will hereinafter be more specifically explained. The entire assembly 26, is attached to a wheel 44, of a lawn mower, as by means of bolts 45 which pass through the disc 10 (Figure 4) and the lawn mower wheel 44.

Figure 5:
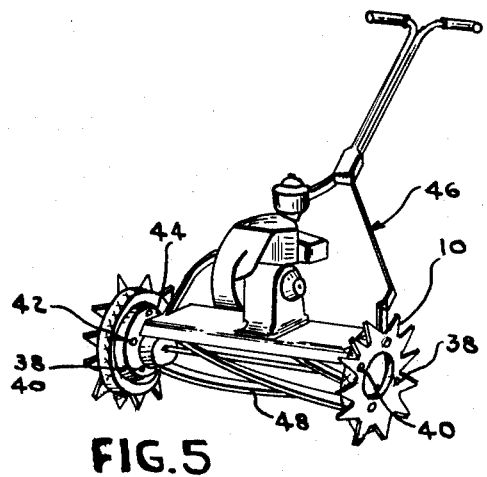
Figure 5 is an installation view of the device attached onto the wheels of a lawn mower.

Having thus described the invention, it will now be apparent to those skilled in the art, that when a disc 10 is attached concentrically to the outer surface of the wheels 44, of a lawn mower 46 (Fig. 5) in any approved manner, as for example by means of bolts 38, and locknuts 40, said bolts picking up matching holes 42 installed in the wheel of the lawn mower; when the lawn mower 46 is operated, the discs 10 will rotate with the wheels of the lawn mower, and the sharp relatively acute teeth 12, will be driven into the ground under the weight of the lawn mower, approximately up to the base 16. At each thirty degree turn of the wheels of the lawn mower, a tooth 12 will be driven into the ground.

Since the inner diameter E of the disc 10 is not greater than the diameter of the wheels of the lawn mower, as heretofore explained, the cutting blades 48, of the lawn mower will then be in their usual position with respect to the ground, and capable of performing their usual cutting operation.

As the lawn mower 46 is operated, and progresses along the surface of a lawn, the teeth 12 automatically spike the lawn rapidly and effectively under the weight of the lawn mower 46, with relatively little effort on the part of the operator.

The center hole 20, is provided for lightening purposes, and serves also as an aperture for the hub of the lawn mower wheel to protrude therethrough, so that the disc 10 will be mounted in close flat contact, firmly against the wheels 44 of the lawn mower 46.

In lieu of a single disc 10, an entire assembly 26, may be attached to the wheels of the lawn mower 46. Since the teeth 12, in either disc 10, of the assembly 26, are staggered by fifteen degrees with respect to the teeth on the companion disc, as heretofore explained, only one tooth 12, of each assembly 26, at the time will be forced into the ground by the mower 46, at each fifteen degree turn of the wheels of the lawn mower. It will be noted therefore that by said arrangement, the condition whereby two teeth of the assembly 26, would be in position to be simultaneously driven into the ground, thereby offering greater resistance, cannot arise.

It will thus be seen that there are provided novel and effective means for spiking a lawn simultaneously with performing the usual mowing operation on the lawn, by utilizing the weight of the lawn mower and with relatively little effort on the part of the operator, whereby the several objects of this invention are achieved, and which means are well adapted to meet the conditions of practical use.

Although only one embodiment, and one application of the invention has been illustrated and described, other changes and modifications in the form and relative arrangement of parts, which will be apparent to those skilled in the art, may be made without departing from the spirit and scope of the invention.

What is claimed is:

In combination with a lawn mower having at least two spaced wheels, a first disc, a plurality of acute teeth about the periphery of said disc, a second disc, a cylindrical spacer between said discs, each of said discs being provided with a plurality of holes, a plurality of bolts through said holes securing said discs and spacer, and at least one of said discs being provided with a plurality of mounting holes therethrough, and bolts in said holes engaging a wheel for attaching said disc to a wheel of a lawn mower.

References Cited in the file of this patent

UNITED STATES PATENTS

| | | |
|---|---|---|
| 1,732,308 | Livingston | Oct. 22, 1929 |
| 2,476,084 | Cour | July 12, 1949 |